United States Patent
Tsui et al.

[11] Patent Number: 5,917,737
[45] Date of Patent: Jun. 29, 1999

[54] FOURIER TRANSFORM MECHANIZATION USING ONE BIT KERNEL FUNCTION

[75] Inventors: James B. Y. Tsui, Dayton; John J. Schamus, Englewood, both of Ohio

[73] Assignee: The United States of America as represented by the Secretary of the Air Force, Washington, D.C.

[21] Appl. No.: 08/914,348

[22] Filed: Aug. 15, 1997

[51] Int. Cl.⁶ .................................................. G06F 15/00
[52] U.S. Cl. ........................................................ 364/726.01
[58] Field of Search .................... 364/726.01–726.07, 364/725.01, 725.02

[56] References Cited

U.S. PATENT DOCUMENTS

| | | | |
|---|---|---|---|
| 4,084,251 | 4/1978 | Gillis, Jr. ............................... | 364/726 |
| 4,970,674 | 11/1990 | White ..................................... | 364/726 |
| 5,059,968 | 10/1991 | Thompson et al. .................... | 342/152 |
| 5,303,172 | 4/1994 | Magar et al. ........................... | 364/726 |
| 5,305,007 | 4/1994 | Orr et al. ................................ | 342/20 |

OTHER PUBLICATIONS

W.T. Cochran, et al., "What is the Fast Fourier Transform?", IEEE Transactions Audio & Electroacoustics, vol. AU–15, Jun. 1967.

*Primary Examiner*—Chuong Dinh Ngo
*Attorney, Agent, or Firm*—Gina S. Tollefson; Gerald B. Hollins; Thomas L. Kundert

[57] ABSTRACT

The present invention provides a realization of a real-time, high frequency Fourier transformation using a single binary-bit kernel function which reduces the mathematical operation mechanizations needed to generate a Fourier transformation from multiplication and associated dense, complex hardware to simple addition and subtraction associated hardware components. The single binary-bit kernel function Fourier transformation generated produces a constant peak amplitude regardless of the number of bits in the input data and is most useful for applications where input data is composed of 1 and 2 binary bits.

10 Claims, 8 Drawing Sheets

FOURIER TRANSFORM MECHANIZATION USING ONE BIT KERNEL FUNCTION

RIGHTS OF THE GOVERNMENT

The invention described herein may be manufactured and used by or for the Government of the United States for all governmental purposes without the payment of any royalty.

BACKGROUND OF THE INVENTION

This invention concerns the field of reduced hardware techniques for generation of Fourier transformations.

A transform is an alternative technique that can be applied to solve a mathematical problem. Conventional techniques apply mathematics directly to the problem, whereas a transform will convert (or transform) the problem into another form that is sometimes simpler to calculate. The results of the transform calculation will then require another conversion to return the problem back to the original format. Many times the conversion can use constants or a lookup table, which can greatly simplify the problem. This is the case with the Fourier transform.

The Fourier transform is a principle analytical tool in many diverse fields, including linear systems, optics, probability theory, quantum physics, antennas, radar, signal analysis and global positioning systems. This transform can be expressed in terms of a discrete solution, called the discrete Fourier transform. The complexity of computing the discrete Fourier transform is often stated in terms of $N^2$, the square of the number of sample points examined. The discrete Fourier transform has found relatively few applications due to its complexity, even given the tremendous computational power and memory of modern processors.

The basic Fourier transform operation when applied to a waveform can decompose a complex waveform into a set of simple sinusoidal waveforms whose sum recreates the initial waveform. The simple waveforms have a representation as an amplitude and frequency. Mathematically, this can be represented as:

$$X(k) = \sum_{n=0}^{N-1} x(n) w^{kn} \quad \text{Eq. 1}$$

where $$w = e^{\frac{-j2\pi}{N}}$$

is the kernel function, a constant value in the Fourier transform, with $j=\sqrt{-1}$ and N is the total number of input points and where X(k) is the kth component in the frequency domain, and x(n) is the input data. On the right side of Eq. 1, k and n are variables. In Eq. 1, therefore, the Fourier transformation is obtained from multiplication of the input data and the kernel function. The present invention simplifies the apparatus used to generate a Fourier transform and thereby reduces size and complexity of the associated hardware. The Fourier transform concepts used in the present invention are novel in that the mathematical operation mechanizations needed to accomplish the Fourier transform are addition and subtraction and necessary hardware components are limited to adders; the requirement for multiplication operations in performing the Fourier transform is eliminated.

SUMMARY OF THE INVENTION

The present invention provides a realization of a real-time, high frequency Fourier transformation using a single binary bit kernel function which reduces the mathematical operation mechanizations needed to generate a Fourier transformation from multiplication and associated dense, complex hardware to simple addition and subtraction associated hardware components.

It is an object of the present invention to provide a real-time high frequency realization of a Fourier transform operation using a single binary-bit kernel function signal.

It is another object of the invention to provide a real-time high frequency realization of a Fourier transform operation using an electronic adder capable of both addition and subtraction operations.

It is another object of the invention to provide a real-time, high frequency realization of a Fourier transform operation using less energy than conventional operations.

It is another object of the invention to provide a reduced hardware real-time high frequency realization of a Fourier transform.

Additional objects and features of the invention will be understood from the following description and claims and the accompanying drawings.

These and other objects of the invention are achieved by a hardware efficient method of performing a Fourier transformation on an electrical signal waveform comprising the steps of: sampling data points consecutively in time from an analog electrical input signal waveform;

converting said data point analog electrical signals from analog to digital format characterized by digital electrical signals and a+jb;

generating a binary-bit kernel function represented by digital electrical signals 1+j, 131 j, −1−j and −1+j;

generating a Fourier transform representation of said electrical input signal waveform by adding said single binary-bit kernel function electrical signals to said digital electrical signals representing data points of said input signal waveform;

said generated Fourier transform representation including a plurality of Fourier transform coefficient signal outputs.

DETAILED DESCRIPTION

Conventional wisdom in the electrical arts suggests the implementation of a Fourier transform function with electronic components necessarily includes the mechanization of complex mathematical multiplications. According to this conventional wisdom, it is difficult to mechanize a Fourier transform-inclusive mathematical algorithm in apparatus which operates in real time at higher radio frequencies because of such complex mathematical computations. As a result, off-line processing is required in most signal processing instances which involve a Fourier transform or related mathematical operations performed on input data that is of any appreciable radio frequency spectral bandwidth. Under these conditions, the processing of the present invention, for example, wherein signals of gigahertz radio frequency carrier and one-tenth microsecond to continuous wave modulation rate are encountered, i.e., signals used in electronic warfare and global positioning receiver systems, would clearly be relegated to the realm of off-line processing in a cumbersome, energy consuming, electronic component-burdened architecture if the Fourier transform mechanization of the present invention were not available.

Even though the prior art identified in connection with the present patent document indicates a number of inventors have implemented a Fourier transform function using a reduced number of computational steps and faster throughput rates, it is believed that none of these efforts have approached the needed processing rates, and operating bandwidth with the capability for implementation on an integrated circuit chip desirable in a present-day Fourier transform operation. The present invention provides a mechanization of a Fourier transform operation using the simple arithmetic operations of addition and subtraction while producing acceptable levels of spurious responses with signal input data having a small number of bits.

The present invention is a mechanization of a Fourier transform operation based on the use of a single binary-bit digital representation of the kernel function. This single bit kernel function is used in the present invention as one term, $$e^{\frac{-j2\pi nk}{N}} \qquad \text{Eq. 2}$$

in the well-known Fourier series transform mathematical expression of:

$$X(k) = \sum_{n=0}^{N-1} x(n) e^{\frac{-j\pi nk}{N}} \qquad \text{Eq. 3}$$

where x(n) are input data points and N is the total number of data points. The kernel function has both real and imaginary parts and both the real and imaginary parts are represented as one data bit each. The kernel function of Eq. 2 at the angles of $\pi/4$, $-\pi/4$, $-3\pi/4$, and $3\pi/4$, on the real-imaginary axis has the following values:

$$(1+j)/\sqrt{2}, (1-j)/\sqrt{2}, (-1-j)/\sqrt{2}, (-1+j)/\sqrt{2} \qquad \text{Eq. 4}$$

which can be normalized to:

$$1+j, 1-j, -1-j, -1+j \qquad \text{Eq. 5}$$

Figure 6:
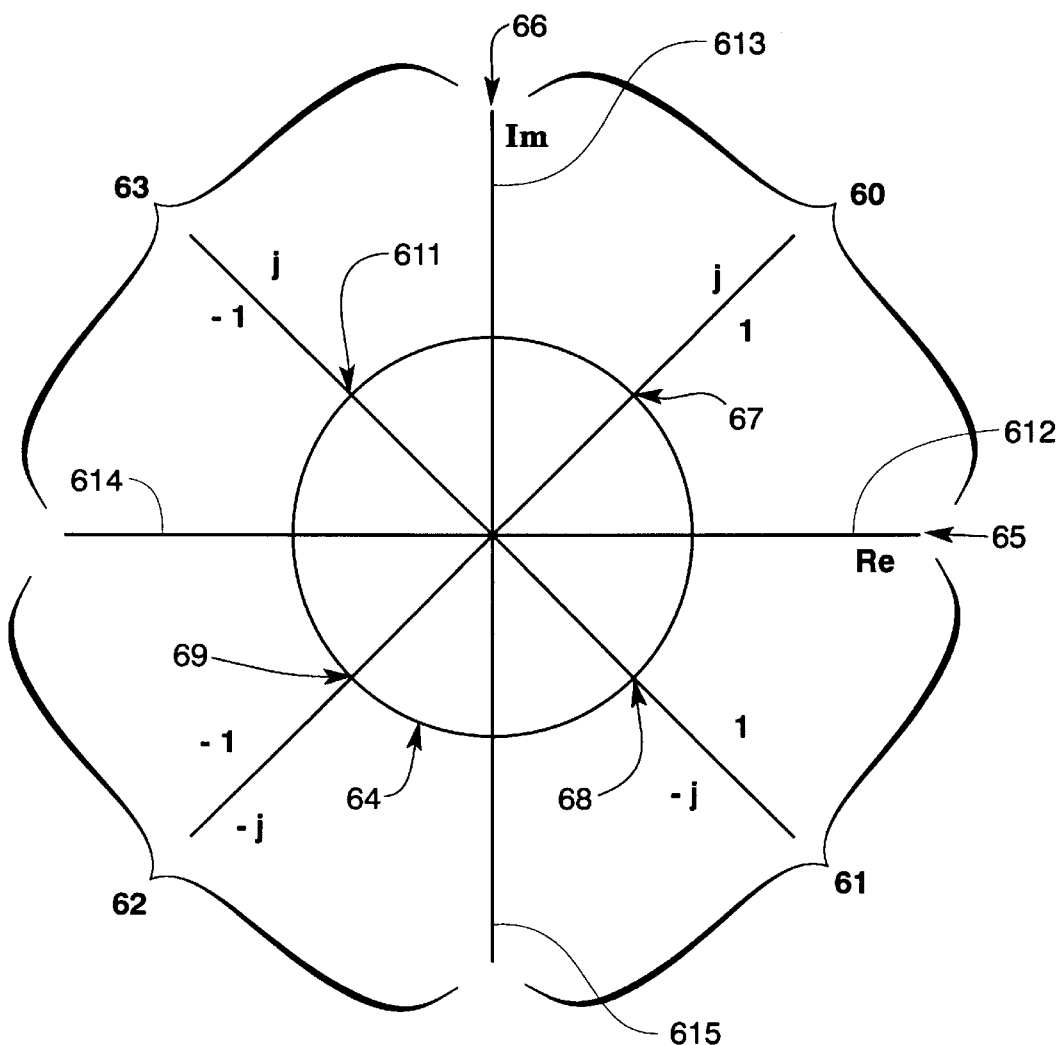
FIG. 6 shows the four quanitized values of the 1-bit kernel function in accordance with the present invention.

Assigning a real component, one or minus one, and imaginary component, j or -j, of the kernel function one binary bit each is illustrated graphically in FIG. 6. FIG. 6 shows a unit circle 64 centered on an intersection of the real axis, 65, and imaginary axis, 66, and broken into four quadrants 60, 61, 62 and 63. As stated infra, the variable $w^{kn}$ is equal to $e^{-j2\pi kn/N}$ which represents an amplitude and an angle θ. The amplitude is a constant value of 1 as shown by the unit circle 64, the angle θ varies around the unit circle. For example, when $$0 \leq \theta \leq \pi/2, \ w^{kn}=1+j; \qquad \text{Eq. 6}$$

$$\pi/2 \leq \theta \leq \pi, \ w^{kn}=-1+j; \qquad \text{Eq. 7}$$

$$\pi \leq \theta \leq 3\pi/2, \ w^{kn}=-1-j. \qquad \text{Eq. 8}$$

$$3\pi/2 \leq \theta \leq 2\pi, \ w^{kn}=1-j. \qquad \text{Eq. 9}$$

This illustrates that values of θ within the region of $0 \leq \theta \leq \pi/2$ are all assigned the single point 1+i. Values of θ throughout the remaining regions of the unit circle are similarly assigned single point values in the three remaining quadrants. The single point values are all assigned one data bit for each of the real and imaginary components. Based on Eq. 3. the input data is multiplied by the kernel function, either one or minus one and j or -j. This greatly simplifies the computation required of the invention. So much so that the necessary hardware components are limited to adders.

When implemented by computer, the kernel function of Eq. 2 results in a quadrant being randomly selected for each kernel function because a computer is unable to distinguish between the positive and negative axis on the unit circle. In order to avoid this uncertainty of randomly selected quadrants, Eq. 2 is modified slightly as $$w = e^{\frac{-j(2\pi+\delta)}{N}} \qquad \text{Eq. 10}$$

where δ is an arbitrarily small value, i.e., 0.000001. The arbitrary small value provides a basis for distinguishing between the positive and negative axis on the unit circle and the correct quadrant for the associated angle can therefore be accurately selected. Using Eq. 6 and a one bit digitizer, the kernel function will predictably result in the values listed in Eq. 5.

The input data to the Fourier transform representation of the present invention are generally complex numbers and can be represented by a+jb, where $j=\sqrt{-1}$ and a, b are the real and imaginary component magnitudes of the input data. The four values of the kernel function from Eq. 5, when operated on an input data signal of (a+jb), will therefore produce the following results:

$$(a+jb)(1+j)=a+jb+ja-b \qquad \text{Eq. 11}$$

$$(a+jb)(1-j)=a+jb-ja+b \qquad \text{Eq. 12}$$

$$(a+jb)(-1-j)=-a-jb-ja+b \qquad \text{Eq. 13}$$

$$(a+jb)(-1+j)=-a-jb+aj-b \qquad \text{Eq. 14}$$

It is apparent in equations 11–14 that no multiplication is required to realize each of these terms; i.e., no multiplication is needed in an apparatus which uses the one-bit kernel function concept in performing the Fourier transformation. In fact, only the sign and the real and imaginary nature of the input data terms a, b need be changed in order to directly determine the nature of a transformed output signal from the input signal data. Unlike conventional fast Fourier transform systems, no multiplication is required. Accordingly, the Fourier transform mechanization of the present invention can be accomplished solely with adders and inverters. A reduction of the kernel function in this processing to one binary-bit is, therefore, a major convenience and a major computation complexity-saving approximation in the present invention.

Figure 7:
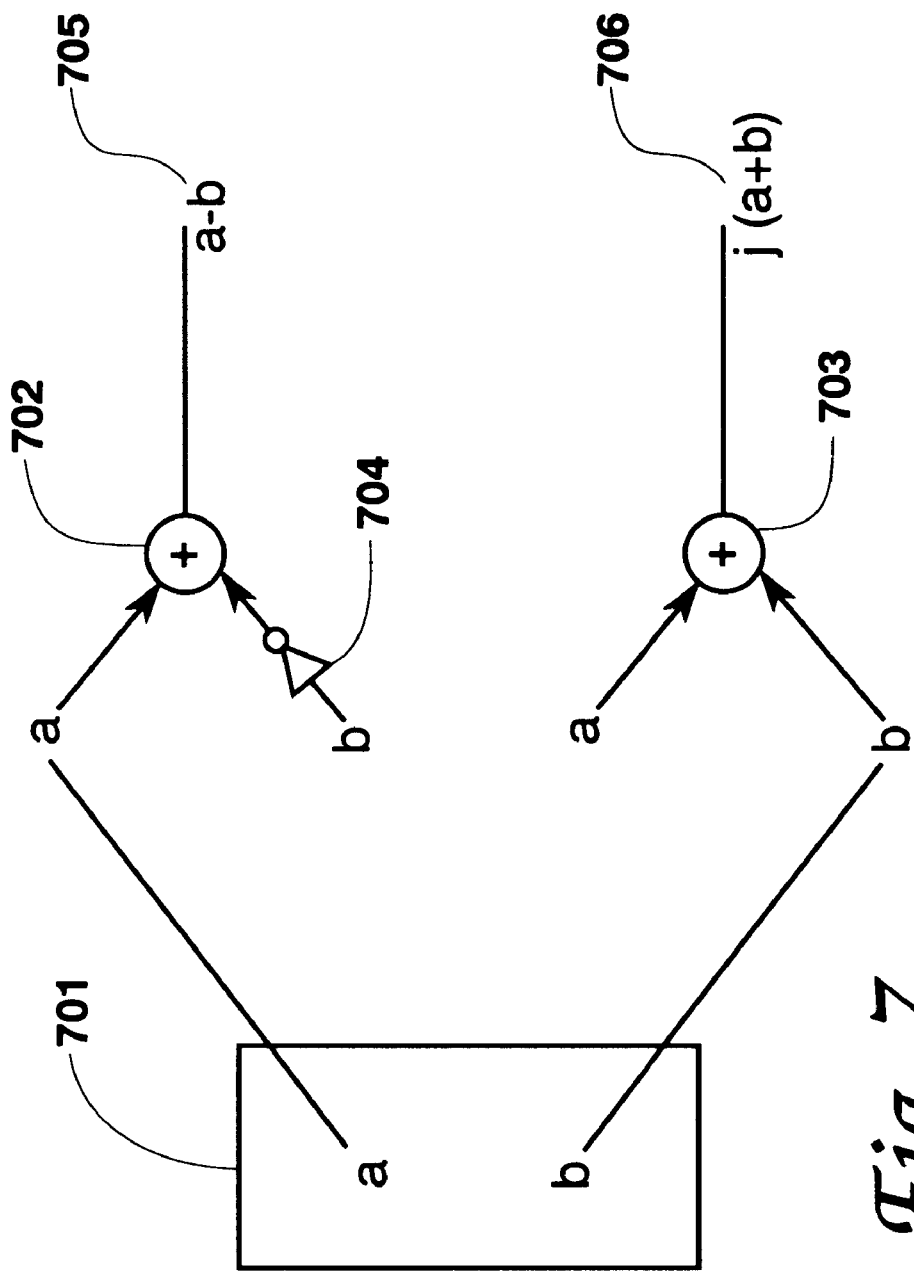
FIG. 7 shows a block diagram of an adder circuit.

For example, FIG. 7 shows a simple block diagram of an adder circuit performing the operation set forth in Eq. 7. The real and imaginary input data are shown in block 701, with real data directed to adder 702 and imaginary data directed to adder 703. The kernel function, represented by 1+j in Eq. 7, determines the existence and location of any inverters. At adder 702, the term b is inverted by inverter 704 and added to the term a to produce the result a–b represented at 705. Similarly, at the adder 703 where the imaginary numbers are directed, a is added to b to produce the imaginary result j(a+b) represented at 706. FIG. 7 illustrates a simple adder circuit with input data of 2 bits and output data of 3 bits. More extensive adder circuits adding data of higher bit numbers are employed, as applicable, in the fast Fourier transform arrangement of FIG. 8.

Figure 8:
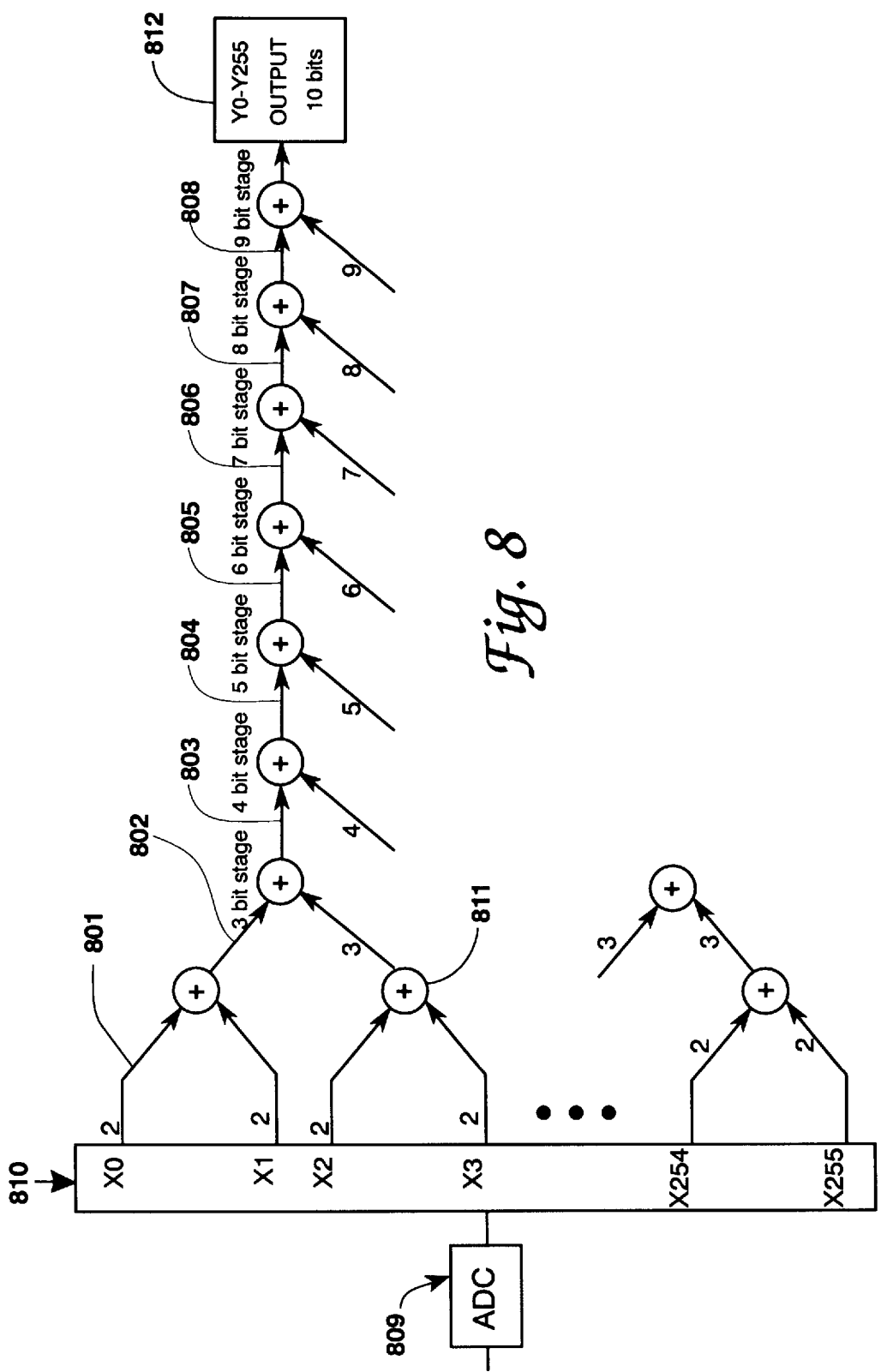
FIG. 8 shows a block representation of the fast Fourier transform mechanization in accordance with the present invention.

For purposes of illustrating a Fourier transform arrangement according to the present invention, assume an example wherein the total number of input data points is N=256 in lieu of the N=1 example discussed in FIG. 1. For a conventional Fourier transform operation with N=256 there are eight layers of adders and multipliers. That eight layers of adders are needed may be appreciated by considering the relationship $N\ln_2 N$ where N is the number of data points of the Fourier transform which is known from Cooley, J. W., and Tukey, J. W. "An Algorithm for the Machine Calculation of Fourier Series," *Math. Comput.* Vol. 19, 1965, pp. 297–310 and W. T. Cochran, et al. "What is the Fast Fourier Transform?", *IEEE Transactions Audio & Electroacoustics* Vol. AU-15, June 1967. Thus, the number of layers for N=256 is 8 because $2^8$=256. For the Fourier transform mechanization of the present invention, with N=256, there are also eight layers of adders used as is shown in FIG. 8. The block diagram of FIG. 8 in fact represents a possible adder arrangement for generating a Fourier transform for the 256 sets of input data, X0–X255 shown at 810. Prior to being operated upon in the adder layers, the input signal is converted from analog to digital format by the analog-to-digital converter represented at 809. The number of input data points produces the same number of output data points and the output data points include complex conjugates. Each set of the output data comprises a 10-bit real and 10-bit imaginary number in the illustration of the present invention.

As discussed above, eight levels or layers of adders, i.e., eight layers of transformation must be accomplished to generate the Fourier transform of the present invention for N=256, with the first stage represented at 801 in FIG. 8 and the eighth stage represented at 808 in FIG. 8. All of the operations represented at the eight stages shown at 801 through 808 are either addition or subtraction of two numbers; the operation at a stage may also be a complement or bypass in instances where the value being added is zero. At each of the adders shown in FIG. 8, one or more of the addition/subtraction operations described in FIG. 7 is performed, only one of which is indicated at 811. The first level starts with a 2-bit operation shown at 801 which produces a 3-bit result shown at 802 (since the addition of two 2-bit numbers cannot produce a sum larger than 3 bits). It is then followed by the 4-bit, 5-bit, 6-bit, 7-bit, 8-bit, and 9-bit operation stages indicated at 803 through 808 in FIG. 8. The Fourier transform output is represented at 812. This output data is then directed for further processing depending on the application for which the Fourier transform operation of the present invention is employed.

Reduction of the kernel function in the Fourier transform in this manner slightly degrades the accuracy of the Fourier transform outputs. However, under certain conditions, such degradation is tolerable. FIGS. 1 through 5 illustrate typical results achieved with the present invention by way of signals found in, for example, a global positioning system receiver. FIGS. 1a through 5a show the results obtained from a conventional unabbreviated Fourier transform operation, an operation without the kernel function assigned a single binary-bit, the kernel function in the drawings having a large number of bits, i.e. 32 bits, and with the input data being comprised of a successively differing number of bits. FIGS. 1b through 5b show the results obtained from the same input data with the Fourier transform operation having a kernel function assigned a single binary-bit in the manner of the present invention. The number of data bits assigned to the input data varies from six in FIG. 1 down to one in FIG. 5. In FIGS. 1 through 5, the left-hand side or x-axis of the graph represents amplitude and the horizontal line or y-axis represents frequency.

The simplified embodiment of Fourier transform kernel functions accomplished by the present invention can reasonably be depicted to result in some degradation in the transformed signals. On significant aspect of this degradation appears in the form of the transform induced spurious responses in the output signal. Such responses are considered in the following paragraphs and illustrated in FIGS. 1 through 5 of the drawings.

Figure 1A:
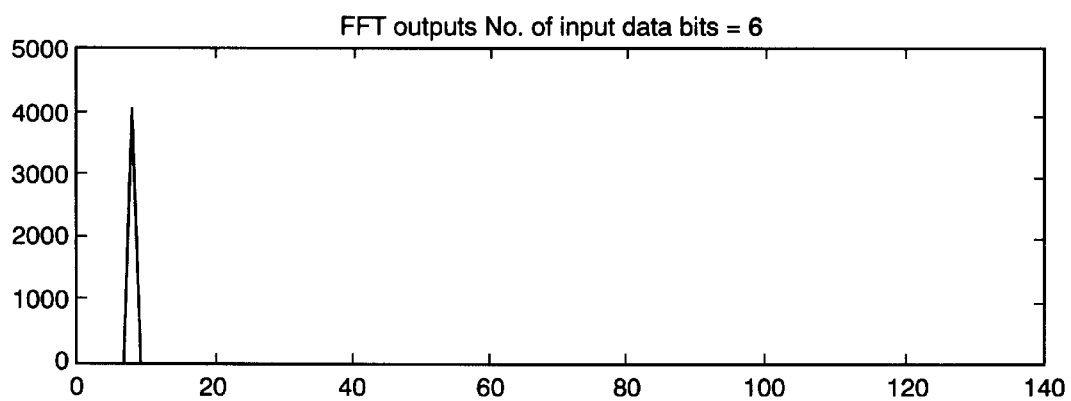
FIG. 1a shows a conventional Fourier transform output with 6-bits of input data.
Figure 1B:
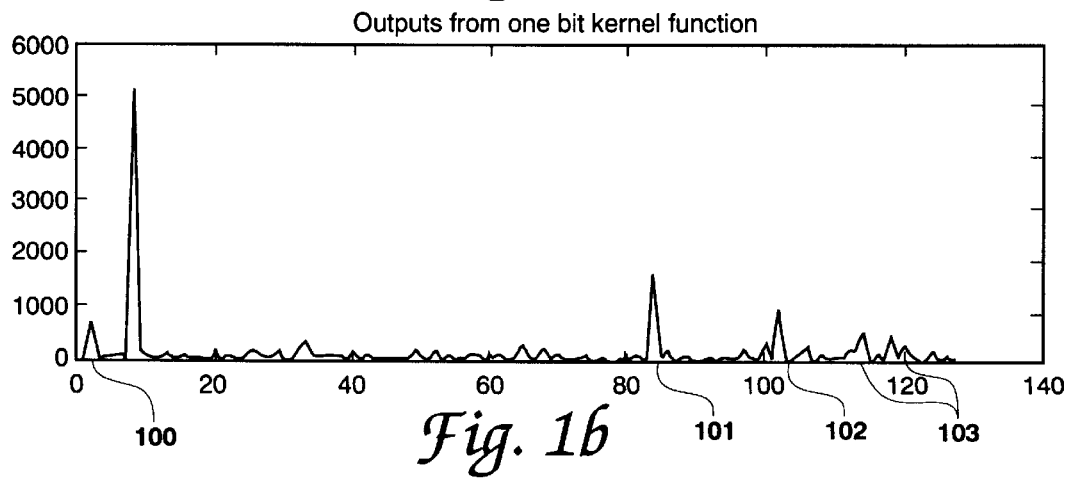
FIG. 1b shows a Fourier transform output with a one binary-bit kernel function and 6-bits of input data.
Figure 2A:
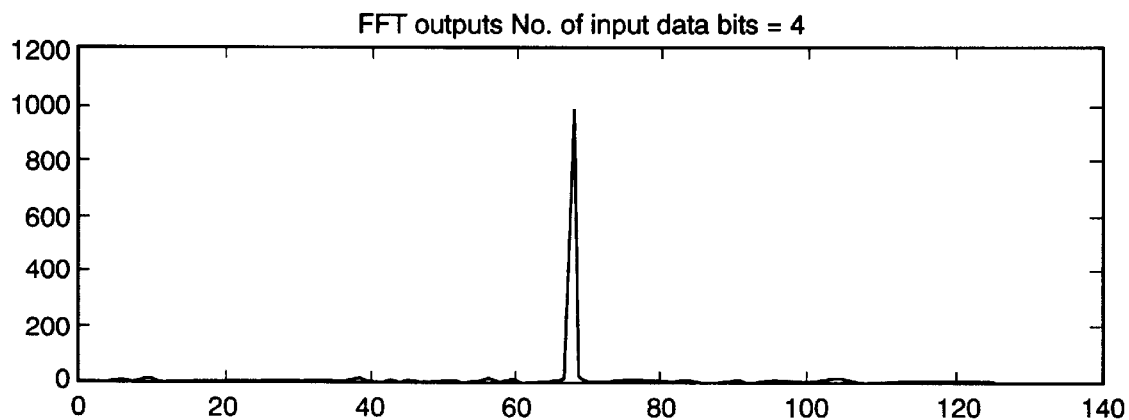
FIG. 2a shows a conventional Fourier transform output with 4-bits of input data.
Figure 2B:
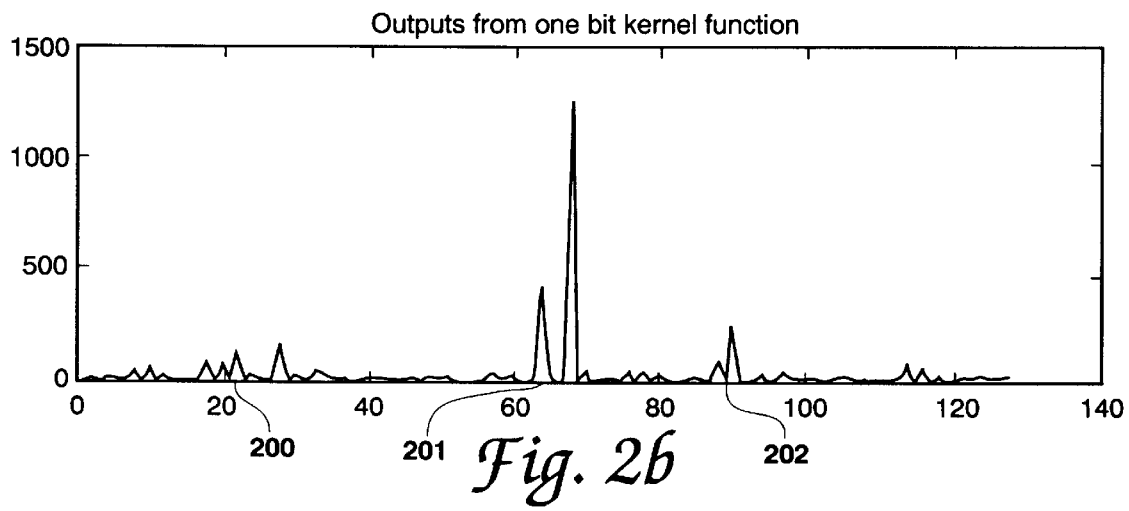
FIG. 2b shows a Fourier transform output with a one binary-bit kernel function and 4-bits of input data.
Figure 3A:
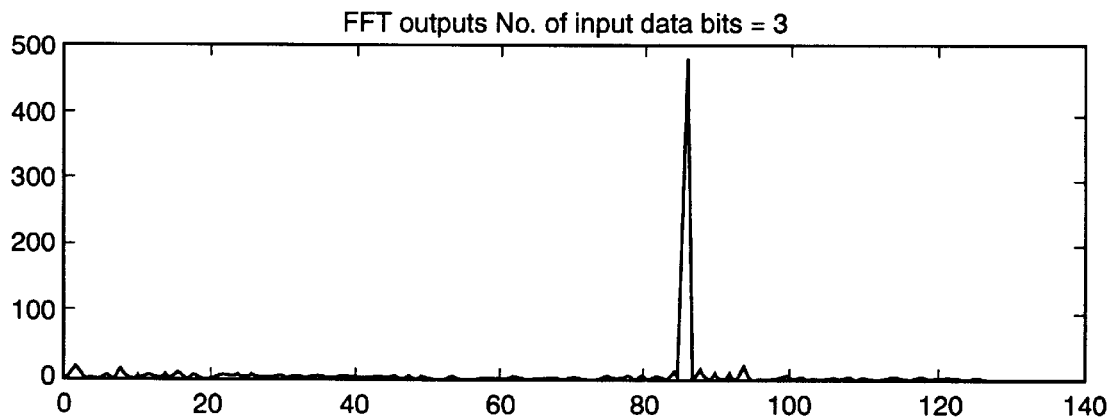
FIG. 3a shows a conventional Fourier transform output with 3-bits of input data.
Figure 3B:
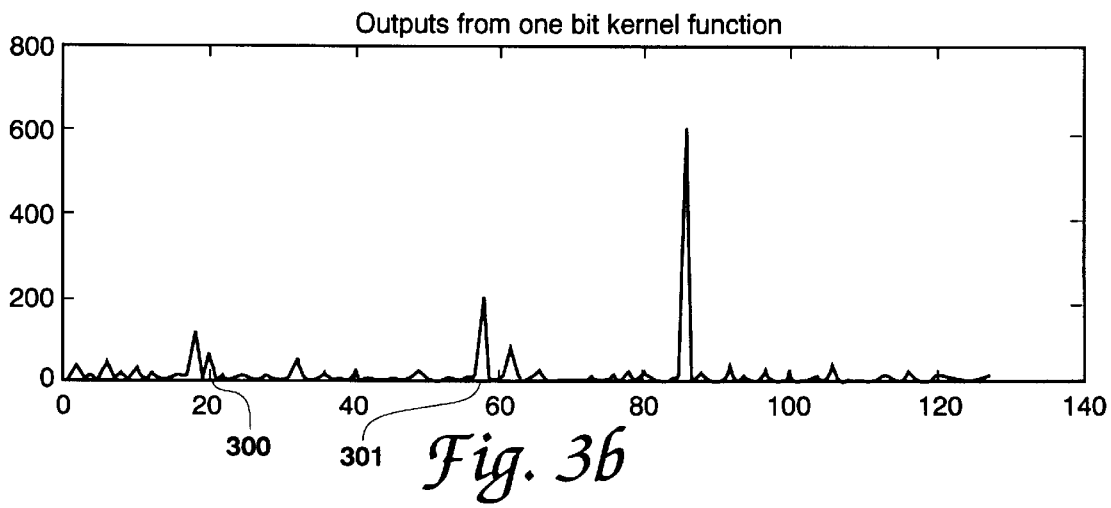
FIG. 3b shows a Fourier transform output with a one binary-bit kernel function and 3-bits of input data.
Figure 4A:
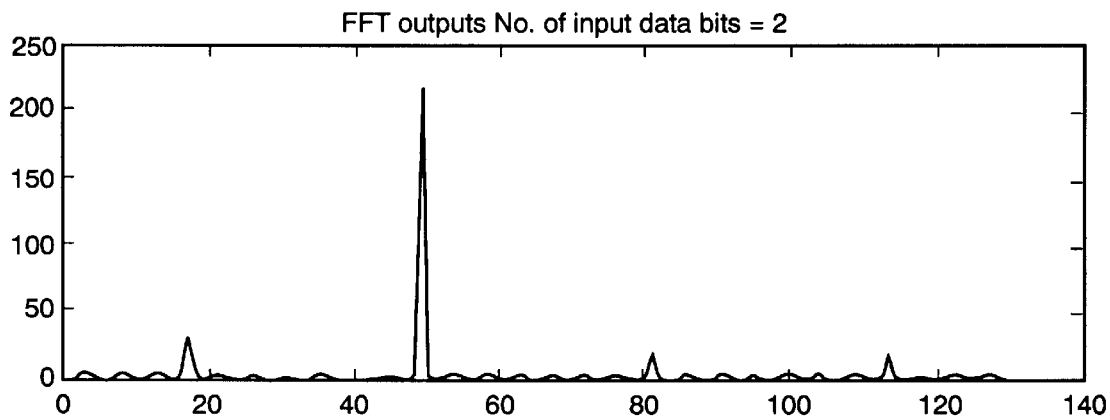
FIG. 4a shows a conventional Fourier transform output with 2-bits of input data.
Figure 4B:
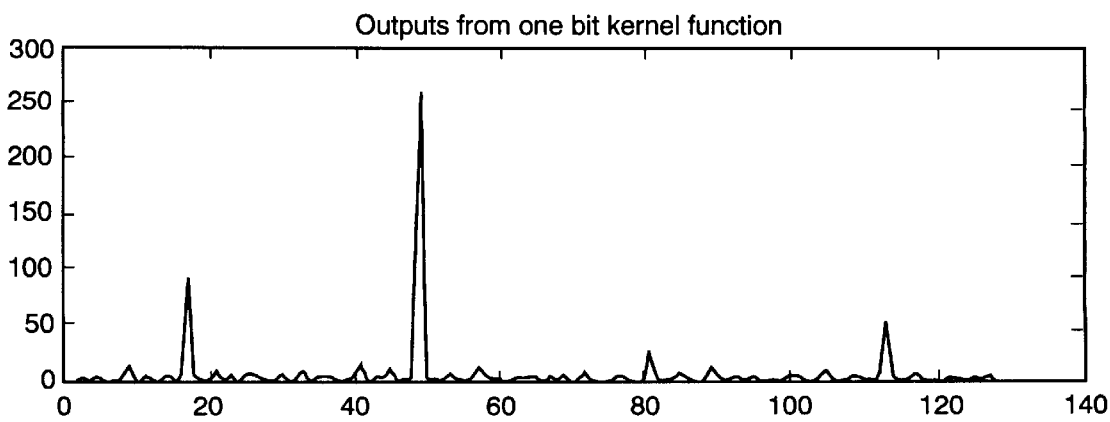
FIG. 4b shows a Fourier transform output with a one binary-bit kernel function and 2-bits of input data.
Figure 5A:
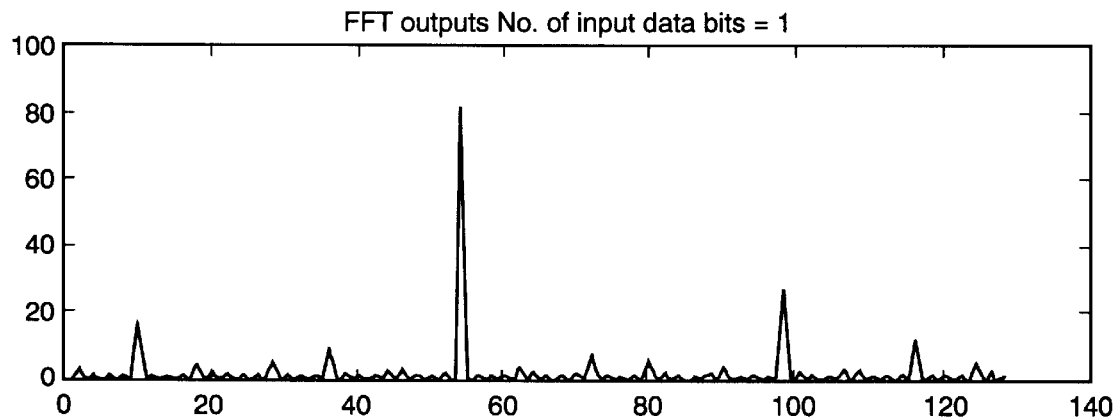
FIG. 5a shows a conventional Fourier transform output with 1-bit of input data.
Figure 5B:
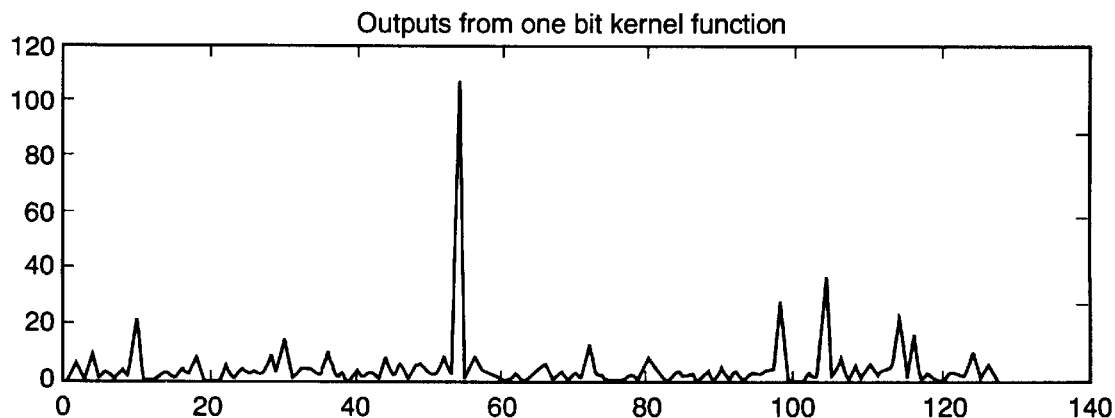
FIG. 5b shows a Fourier transform output with a one binary-bit kernel function and 1-bit of input data.

In FIG. 1a the conventional Fourier transform together with a signal of 6 input data bits provides output having no noticeable spurious responses, but in FIG. 1b the fast Fourier transform representation with a one binary-bit kernel function with a signal of 6 input data bits generates several spurious responses with the most notable being shown at 100, 101, 102 and 103. FIGS. 2b and 3b with input signals having of 4 and 3 data bits, respectively, produces fast Fourier transform representations with noticeable spurious responses at 200, 201 and 202 and 300 and 301, respectively, relative to the conventional Fourier transform representations of FIGS. 2a and 3a. In contrast to the Fourier transform representations of FIGS. 1 through 3 with 6, 4 and 3 input data bits, respectively, the Fourier transform representations of FIGS. 4 and 5 have input signal data with 2 bits and 1 bit, respectively, and most notably the spurious responses are similar for Fourier transform representations with and without a single binary-bit kernel function.

FIGS. 1 through 5 illustrate that for input data having many bits, the Fourier transform representations employing a conventional kernel function are significantly different from the Fourier transform representations produced using a single binary-bit kernel function. When the input data has 1 or 2 bits, however, the difference in the Fourier transform representations using a conventional kernel function with a random number of bits and using a single binary-bit kernel function are less noticeable. Thus, when data input to the Fourier transform operation of the present invention has a very small number of bits, using a single binary-bit kernel function may generate acceptable results. For example, in global positioning system receivers, the input data usually contains 1 or 2 bits, and a Fourier transformation representation using a single binary-bit kernel function is acceptable. Also, in an electronic warfare receiver where input data can be a single binary bit, a Fourier transform representation using a single binary-bit kernel function is probably acceptable.

FIGS. 1 through 5 also illustrate that the peak amplitude of the signal associated with a given input frequency is maintained regardless of whether a conventional or a single binary-bit kernel function is employed. Thus, if the peak amplitude of the frequency is the only desired information, as in some types of electronic warfare receivers, a Fourier transformation employing a single binary-bit kernel function is acceptable. However, the present invention is not appropriate when it is desired to measure more than two signals in the frequency domain because the dynamic range will be limited by spurious responses generated in a Fourier transform representation using a single binary-bit kernel function.

Our prior work has attempted to simplify processing of the Fourier transformation by assigning the input data x(n) of Eq. 1 a single binary-bit value. The limitations of that approach are that the Fourier generated output and, accordingly, performance of the associated receiver is somewhat unsatisfactory unless the input data is assigned at least a two-bit value. Further, the kernel function still remains as part of the Fourier transform equation and was difficult to implement into hardware when not assigned a single binary-bit value. By contrast, the present invention with a kernel function having a single binary-bit value is implemented into hardware using only adders and the input data may assume as low as a one-bit value and produce satisfactory results, both of these features greatly simplifying the invention over prior implementations.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A hardware efficient method of performing a Fourier transformation on an electrical signal waveform comprising the steps of:

sampling data points consecutively in time from an analog electrical input signal waveform;

converting said sampling step data points from analog to digital format characterized by digital electrical signals;

generating a binary-bit kernel function represented by 1+j, 1−j, −1−j and −1+j and characterized by digital electrical signals; and generating a Fourier transform representation of said electrical input signal waveform by multiplying said binary-bit kernel function with data points of said input signal waveform;

said generated Fourier transform representation including a plurality of Fourier transform coefficient signal outputs.

2. The hardware efficient method of performing a Fourier transformation of claim 1 further including the step of eliminating conjugate values from said generated Fourier transform representation.

3. The hardware efficient method of performing a Fourier transformation of claim 1 wherein said data points are sampled from the electrical output signals of a global positioning system.

4. The hardware efficient method of performing a Fourier transformation of claim 1 wherein said generated Fourier transform produces a constant peak amplitude for any bit number of input data.

5. The hardware efficient method of performing a Fourier transformation of claim 1 further including the step of displaying said generated Fourier transform.

6. A hardware efficient method of performing a Fourier transformation on an analog input signal waveform comprising the steps of:

sampling data points consecutively in time from said analog electrical input signal waveform;

converting said analog electrical input signals from analog to digital format;

generating a Fourier transform representation of said analog electrical input signal waveform using a single binary bit electrical signal kernel function defined as the digital electrical signal $$w = e^{\frac{-j2\pi}{N}}$$

from the mathematical equation $$X(k) = \sum_{n=0}^{N-1} x(n) w^{kn}$$

where x(n) are digital electrical input data points and N is the total number of digital electrical signal data points.

7. A hardware efficient Fourier transform generating electrical circuit device comprising the combination of:

a source of input electrical signals;

a Fourier transform generating circuit including an electrical signal kernel function of form
1+jb,
1−jb,
−1+j;
−1−j;

said Fourier transform generating circuit including an electrical circuit for multiplying said source of input electrical signals with said electrical signal kernel function; and an output circuit connected to said electrical circuit for providing a Fourier transform representation of said input electrical signals.

8. The hardware efficient fast Fourier transform generating electrical circuit device as in claim 7 wherein said output circuit eliminates all conjugate values from said Fourier transform representation.

9. The hardware efficient fast Fourier transform generating electrical circuit as in claim 7 wherein peak amplitude of said output Fourier transform representation remains constant for all bit numbers comprising each of said electrical input signals.

10. The hardware efficient fast Fourier transform generating electrical circuit as in claim 7 wherein source of said input electrical signals is a global positioning system.

* * * * *